(12) United States Patent
Neumann

(10) Patent No.: US 6,570,903 B2
(45) Date of Patent: May 27, 2003

(54) ELECTRIC-OPTICAL SINGLET SIGMA AND SINGLET DELTA OXYGEN GENERATOR

(75) Inventor: David K. Neumann, Colorado Springs, CO (US)

(73) Assignee: Neumann Information Systems, Inc., Colorado Springs, CO (US)

(*) Notice: Subject to any disclaimer, the term of this patent is extended or adjusted under 35 U.S.C. 154(b) by 114 days.

(21) Appl. No.: 09/791,866

(22) Filed: Feb. 26, 2001

(65) Prior Publication Data

US 2001/0033597 A1 Oct. 25, 2001

Related U.S. Application Data

(60) Provisional application No. 60/187,390, filed on Mar. 7, 2000.

(51) Int. Cl.$^7$ .................................. H01S 3/095
(52) U.S. Cl. ......................... 372/89; 372/82; 372/51
(58) Field of Search ..................... 372/87–90, 56, 372/57–59, 60–63, 64–68, 55

(56) References Cited

U.S. PATENT DOCUMENTS

| | | | | |
|---|---|---|---|---|
| 31,868 A | * | 4/1861 | Beasley et al. ............... | 372/57 |
| 3,701,045 A | * | 10/1972 | Bronfin et al. ............... | 359/342 |
| 4,418,413 A | * | 11/1983 | Hon ............................. | 372/10 |
| 4,558,451 A | * | 12/1985 | McDermott et al. .......... | 372/89 |
| 4,653,062 A | | 3/1987 | Davis et al. | |
| 5,260,816 A | * | 11/1993 | Edagawa et al. ............. | 372/103 |
| 5,286,338 A | * | 2/1994 | Feldblum et al. ............. | 216/26 |
| 5,369,659 A | * | 11/1994 | Furumoto et al. ............ | 372/101 |
| 5,417,928 A | * | 5/1995 | McDermott ................... | 372/55 |
| 5,516,502 A | * | 5/1996 | Dickerson .................... | 372/55 |
| 5,537,209 A | * | 7/1996 | Lis ............................... | 356/487 |
| 5,658,535 A | | 8/1997 | Thayer, III | |
| 5,740,062 A | * | 4/1998 | Berken et al. ............... | 318/640 |
| 5,853,960 A | * | 12/1998 | Tran et al. .................... | 216/2 |
| 5,925,286 A | | 7/1999 | Clendening, Jr. et al. | |
| 6,072,820 A | * | 6/2000 | Dickerson .................... | 372/104 |
| 6,154,478 A | * | 11/2000 | Vetrovec ...................... | 372/34 |
| 6,219,368 B1 | * | 4/2001 | Govorkov ..................... | 372/57 |
| 6,327,290 B1 | * | 12/2001 | Govorkov et al. ............ | 211/163 |
| 6,331,993 B1 | * | 12/2001 | Brown .......................... | 372/55 |
| 6,377,600 B1 | * | 4/2002 | Flegal .......................... | 372/89 |
| 6,426,966 B1 | * | 7/2002 | Basting et al. ............... | 372/100 |

* cited by examiner

Primary Examiner—Paul Ip
Assistant Examiner—Tuan Nguyen
(74) Attorney, Agent, or Firm—Law Office of Dale B. Halling, LLC

(57) ABSTRACT

A generator produces a flow of gaseous molecular oxygen in the singlet sigma and/or singlet delta excited electronic states. The generator is comprised of an optical source; coupling optics to transport and concentrate optical source light; a vacuum chamber, reflective optics; a wall cooling system; an inlet system for injecting oxygen; an inlet system for injecting other gases which deactivate singlet sigma oxygen to singlet delta oxygen; and a means for interfacing this device to a lasing device and for directly flowing the singlet sigma or singlet delta oxygen into a laser cavity.

20 Claims, 3 Drawing Sheets

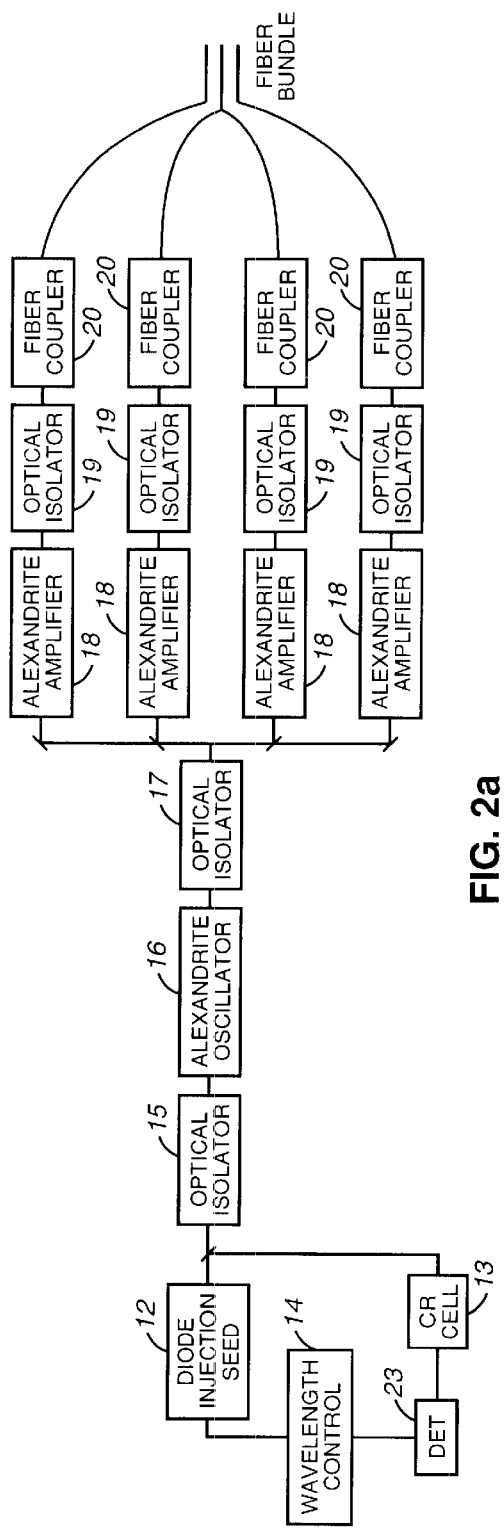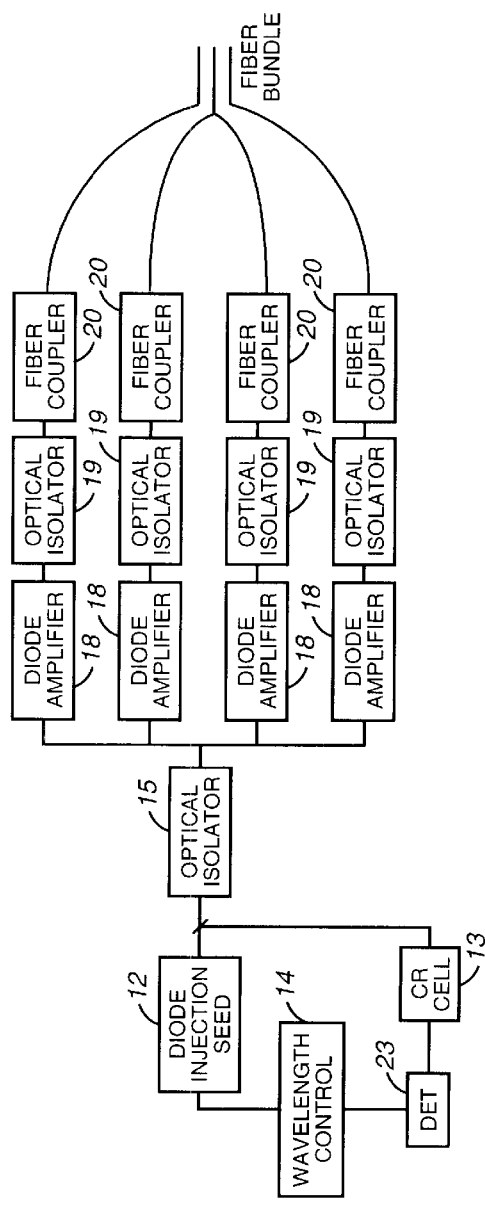
FIG. 2a
FIG. 2b

ELECTRIC-OPTICAL SINGLET SIGMA AND SINGLET DELTA OXYGEN GENERATOR

RELATED APPLICATIONS

This application claims priority from and the benefit of U.S. provisional application No. 60/187,390, filed Mar. 7, 2000.

BACKGROUND OF THE INVENTION

The chemical oxygen iodine laser works by generating excited oxygen gas through a chemical process, transporting this excited gas to a laser cavity where it mixes with molecular iodine, dissociates the iodine into atoms and transfers its energy into the iodine atoms. Spontaneously emitted photons, in conjunction with an optical cavity, stimulate the emission of light from the iodine atoms in a coherent beam. De-excited atoms are re-excited through collisions with the excited oxygen. The cycle of exciting, stimulating and de-exciting the iodine atoms continues until energy in the oxygen reservoir is depleted down to some threshold value determined by the temperature of the medium In the chemical oxygen iodine laser the chemically generated, excited oxygen is the energy source for the laser and the iodine is the means for converting the stored energy to laser light.

Gas phase, diatomic, molecular oxygen is capable of existing in a number of different energy states. The lowest energy state is termed the ground state and denoted $O_2$ ($X^3\Sigma$). The first excited state, $O_2$ ($a^1\Delta$), exists approximately 1 electron-volt above the ground state and is the state of oxygen which stores energy for use in the chemical oxygen iodine laser. The second excited state, $O_2$ ($b^1\Sigma$), exists about 1.6 electron-volts above the ground state and has been created by the collision of two $O_2$ ($a^1\Delta$) molecules. Therefore, the formation of this species represents a loss mechanism affecting the efficiency of the laser.

To power a chemical oxygen iodine laser, $O_2$ ($a^1\Delta$) has to be created in large densities and large ratios relative to the $O_2$ ($X^3\Sigma$) ground state oxygen. The primary process used to create $O_2$ ($a^1\Delta$) in the percentage and density to power a laser has been the reaction of a halogen gas with a liquid mixture of an alkali hydroxide and hydrogen peroxide. This chemical process has been the basis for numerous chemical generator designs since 1977.

Optical sources and detectors have been used to study oxygen and its first two excited states since 1933. In some cases lasers have been used to optically excite ground state oxygen, $O_2$ ($X^3\Sigma$), to its second electronically excited state, $O_2$ ($b^1\Sigma$) for the purpose of studying its properties and deactivation mechanisms. Optical transitions induced by laser light or any light source are rather difficult to achieve because of the low cross-section for interaction between the light and the molecule. The transition to this state is therefore termed "not allowed." Reactions of various gas species like $O_2$, CO, HBr, etc. with this state of oxygen have been found to deactivate the $O_2$ ($b^1\Sigma$) to $O_2$ ($a^1\Delta$) with 100% efficiency. Additionally collisions with walls made of glass and stainless steel have also shown this preferential deactivation channel to $O_2$ ($a^1\Delta$). In part this deactivation process explains why the formation of $O_2$ ($b^1\Sigma$) in the laser is not as serious a loss mechanism, since same of the energy is recovered through its deactivation.

The advances over the last ten years in semiconductor and solid state lasers have presented industry with a wide range of tools for use in optically triggered processes. In the present case, to excite significant fractions of oxygen at high density to the $O_2$ ($b^1\Sigma$) state requires the use of specially tailored, high intensity, narrow-band light sources. Three types of sources meet the minimum requirements for generating sufficient excited oxygen densities to support laser output from an oxygen iodine medium. These are solid state lasers (Ti:sapphire and Alexandrite); diode lasers (including InGaAsP and GaASP-AlGaAS tensile-strained quantum well lasers); and fiber lasers (doubled, Erbium doped fiber lasers).

SUMMARY OF THE INVENTION

The present invention overcomes the problem of the use of toxic and explosive chemicals in the generation of excited oxygen for the chemical oxygen iodine laser. Additionally it provides a clean source and high flow rate of excited oxygen for use in other potential laser systems. An electric-optical generation process, yielding high fractions of excited oxygen, replaces the chemical generation process for excited oxygen in the chemical oxygen laser.

Light is generated from electric laser sources and coupled into a cold oxygen gas flow, producing large fractions of the oxygen in the second excited electronic state. Since the light is rather wealdy absorbed on a per unit length basis optics are used to multi-pass the incident beam through the medium until greater than 90% of the light is absorbed. Combination of the wall collisions and gas phase collisions deactivate the oxygen from its second excited state to its first excited state the singlet delta state. Incident continuous light fluences of 50–100 kw/cm$^2$, oxygen gas pressures of 30 torr–70 torr, oxygen gas temperatures of 100 K–150 K, absorption lengths of 10 meters–15 meters and flow velocities of 10 meters/s yield a greater than 40% fraction of the flow in the desired excited state of oxygen. Wall collisions or the addition of about 0.1 torr of HBr efficiently deactivates the singlet sigma to singlet delta in the required time frame.

DESCRIPTION OF PREFERRED EMBODIMENT OF THE INVENTION

Figure 1:
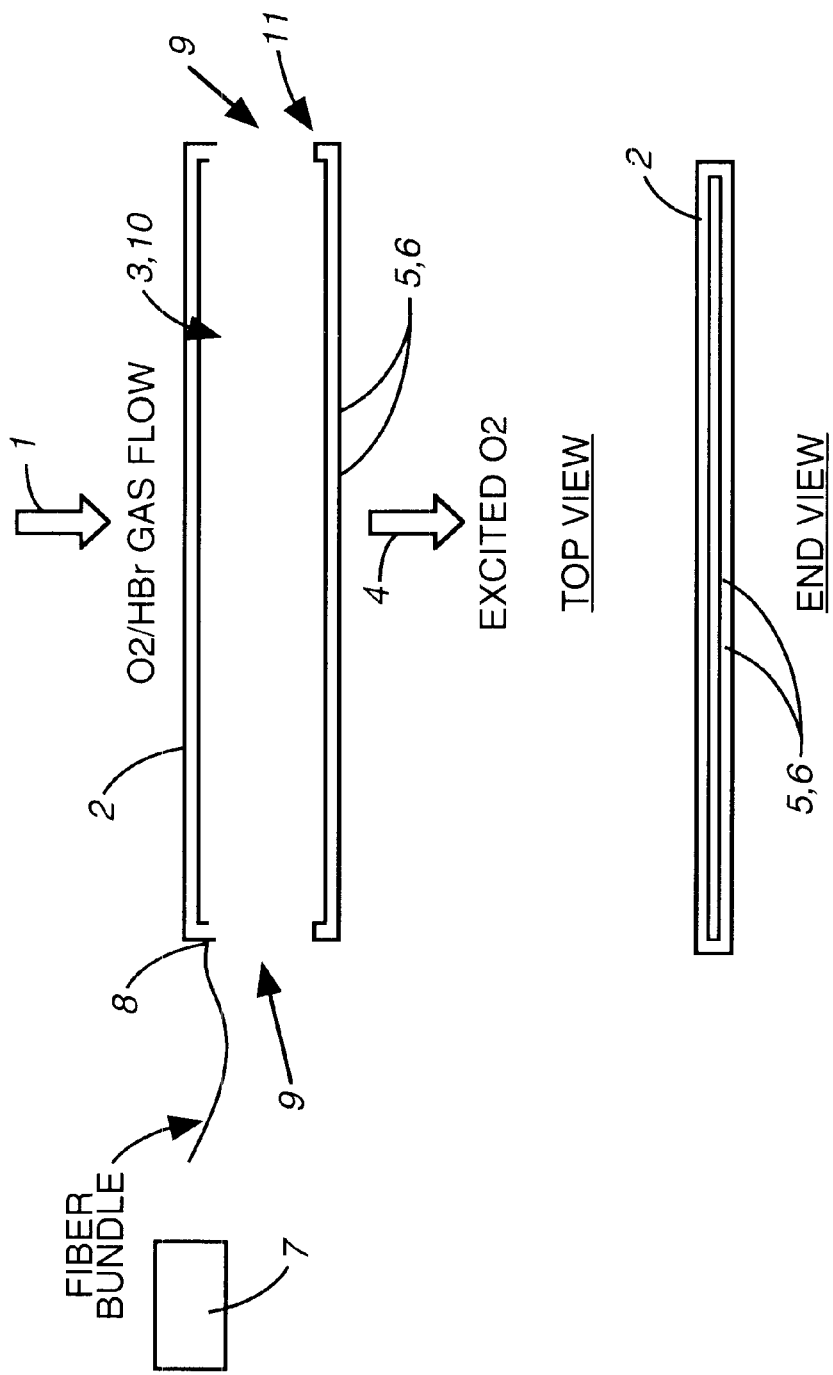
FIG. 1 is a top and end view of the preferred embodiment of the device.

In FIG. 1 a gaseous flow of oxygen and hydrogen bromide 1 are admitted to a chamber 2 where they are illuminated by an optical beam 3 and then the combined stream is expelled 4 with the oxygen in an altered, excited state. Liquid Nitrogen coolant 5 is flowed through channels 6 embedded in the top and bottom of the chamber 2 walls for the purpose of maintaining a low gas temperature. Light from one of the embodiments of the optical pump 7 shown in FIG. 1 is fiber coupled to a collimating microlens array 8 which directs the light into the chamber 2 in a direction perpendicular to the gaseous flow 1. Corner cube reflectors 9 are used to receive, laterally shift, and return the optical beam 10 in the opposite direction illuminating an adjacent portion of the gaseous flow. Portions of the light are absorbed by the gaseous flow on each successive pass through. At the end of multiple passes through the gas a single retroreflector 11 reflects the remaining light back along its original path enhancing the amount of light coupled into the gaseous oxygen flow 1.

Figure 2C:
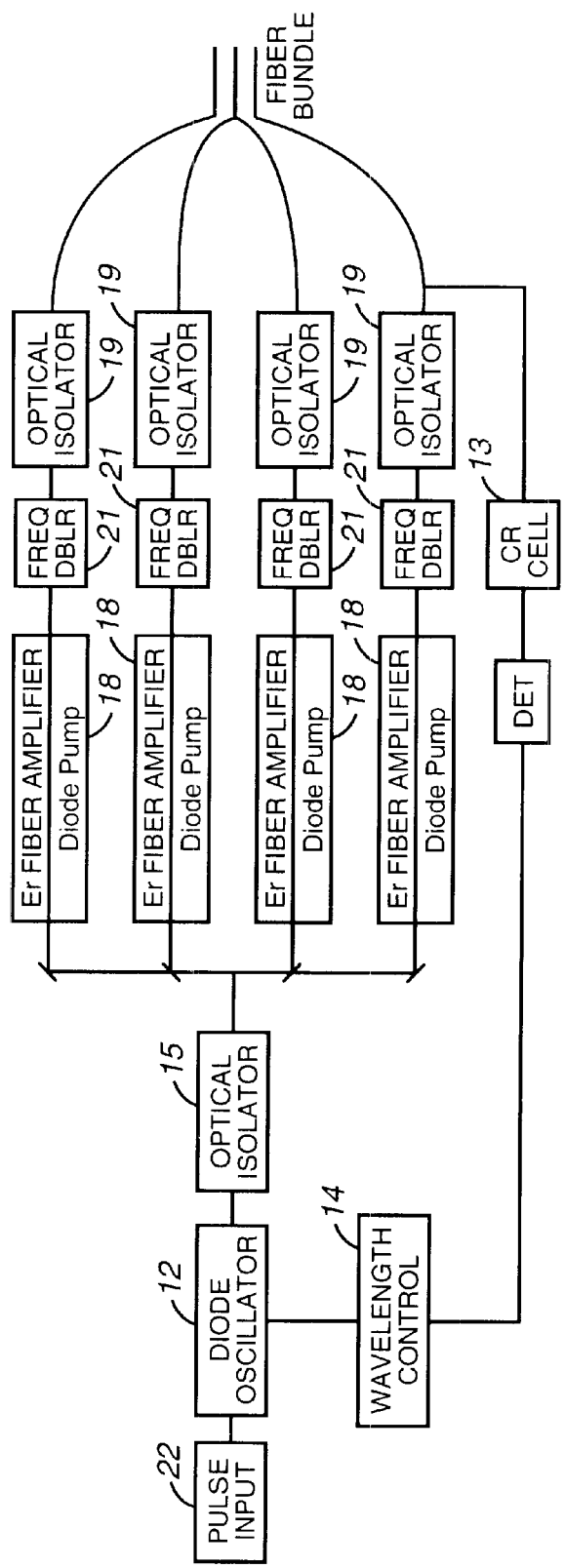
FIG. 2 is a view of three separate types of optical pump systems used for exciting the singlet oxygen.

In FIG. 2 three separate embodiments of optical pump sources that will suffice to optically excite the required quantities of singlet molecular oxygen are shown. FIG. 2a shows a series of commercially available, injection locked Alexandrite lasers which use fiber optics to couple light to the oxygen flow cell in FIG. 1. FIGS. 2b show a configuration for a diode seed and diode amplifier system. FIG. 2c shows shows a diode oscillator and Erbium doped fiber amplifier system. The operation of each source is similar. In FIG. 2a diode laser source 12 generates light which illuminates an oxygen cell 13 with the narrowband, 764 nm light. A detection system 23 views emission from singlet sigma oxygen at a separate and distinct wavelength. The wavelength control device 14 shifts the diode source light until the singlet sigma fluorescence is maximized. After passing through an optical isolator 15, narrow band light from the diode laser source 12 is used to stabilize the frequency of an oscillator 16. After passing through a second isolator 17 the light is split into beams which illuminate a series of amplifiers 18. The amplified beams of light also pass through optical isolators 19 and then are coupled into optical fibers 20. The optical sources in FIGS. 2b and 2c are configured similarly, with the following additions. In FIG. 2b there are only two stages of light generation as opposed to the three shown in FIG. 2a and the amplifier 18 is a diode amplifier. In the case of the Erbium doped fiber system in 2c the light must first be frequency doubled using a doubling crystal 21 before being exposed to the oxygen cell and it is the frequency doubled light that is the tuning source for the singlet singma detection system 23.

ILLUSTRATIVE DESIGN EXAMPLE

An optical generator produces 50 kw/cm$^2$ of light resonant with an oxygen transition at a wavelength near 764 nm. Multiple individual optical units are used to form the full size optical generator. Through appropriate design of the optical generator, the light is emitted in a narrow band with a frequency width of less than 400 Mhz. Light from the individual optical units is transmitted through fiber optics to a chamber where the beams from the individual fibers are collimated using a lens array and incoherently illuminate the oxygen gas flowing in the chamber. The fiber optic bundle is configured into a 1 cm×1 cm stack yielding a fluence incident on the chamber of 50 kw/cm^2. Light from each fiber is expanded and collimated by a two-lens stack, microlens array to uniformly fill the aperture. The chamber has dimensions of 1 cm high by 15 cm wide (flow direction) by 100 cm deep (optic axis direction). The walls are cooled by a liquid nitrogen recirculation system with coolant lines embedded in the walls. The chamber contains a flow of ultra pure oxygen flowing at 10 m/s, at a pressure of 50 torr and a temperature of 100K. Approximately 0.1 torr of HBr is added to the flow for purposes of deactivating the singlet sigma. Using corner cube reflective elements, the optical path is folded 8 times and then reflected back on itself yielding a net effective path length of 16 meters for absorption of the light. Approximately 90% of the light is absorbed over this path length. The net result of the light absorption is the production of large quantities of singlet sigma oxygen. Singlet sigma oxygen collisions with other gas species and the walls result in the deactivation of singlet sigma to singlet delta oxygen. The net result after the oxygen flow traverses the optical beam is the generation of greater than 40% of the oxygen in the singlet delta state, a condition far exceeding that necessary to supporting lasing action in an oxygen iodine laser.

I claim:

1. An e electric-optical singlet sigma and singlet delta oxygen generator, comprising:
    a chamber through which is passed a gaseous flow of oxygen;
    an optical source for generating an optical beam;
    a collimating microlens array, a fiber coupling said optical source to said collimating mircolens array, for directing the optical beam into said chamber, said optical beam exciting the gaseous flow of oxygen; and
    a plurality of optical elements within said chamber for redirecting said optical beam so that said beam passes repeatedly through said gaseous flow to enhance light absorption and generate singlet delta oxygen.

2. The generator as set forth in claim 1, wherein the gaseous flow of oxygen includes hydrogen bromide to deactivate singlet sigma oxygen.

3. The generator as set forth in claim 1, wherein said plurality of optical elements include a plurality of corner cube reflectors within said chamber for receiving, laterally shifting and returning said optical beam through an adjacent portion of said gaseous flow, and a retroreflector for reflecting remaining light back along an original path of travel.

4. The generator as set forth in claim 1, wherein said optical beam is directed into said chamber perpendicular to said gaseous flow.

5. The generator as set forth in claim 1, wherein an output of the collimating microlens array has incident continuous light fluences of 50–100 kw/cm$^2$.

6. The generator as set forth in claim 5, wherein oxygen gas pressures range from approximately 30 torr to 70 torr, and oxygen gas temperatures range from approximately 100K to 150K.

7. The generator as set forth in claim 6, wherein said plurality of optical elements yield absorption lengths ranging from approximately 10 meters to 20 meters, and said gaseous flow of oxygen has a flow velocity of approximately 10 meters/second.

8. The generator as set forth in claim 6, said chamber including a liquid nitrogen cooling system embedded therein.

9. The generator as set forth in claim 1, said optical source comprising:
    a diode laser source for generating light to illuminate an oxygen cell;
    a wavelength control device, coupled to said diode laser source, for shifting the diode source light to maximize singlet sigma fluorescence;
    a detection system, coupled to said wavelength control device, for viewing emission from singlet sigma oxygen at a selected wavelength;
    an optical isolator, coupled to said diode laser source and to said oxygen cell; and
    an amplifier system, coupled to an output of said optical isolator.

10. The generator as set forth in claim 9, said amplifier system including a series of Alexandrite lasers, each Alexandrite laser coupled to a respective fiber coupler through a respective optical isolator.

11. The generator as set forth in claim 9, said amplifier system including a plurality of diode amplifiers, each diode amplifier coupled to a respective fiber coupler through a respective optical isolator.

12. The generator as set forth in claim 9, said amplifier system including a plurality of Erbium doped fiber amplifiers, each fiber amplifier coupled to a respective fiber coupler through a respective frequency doubler.

13. The generator as set forth in claim 10, said optical source further comprising:
- an Alexandrite oscillator coupled to said optical isolator; and
- a second optical isolator coupled between said Alexandrite oscillator and said amplifier system.

14. A method of generating singlet sigma and singlet delta oxygen comprising:
- creating a gaseous flow of oxygen through a chamber using a pump;
- directing an optical beam from an optical source into the chamber to excite the gaseous flow of oxygen by a collimating microlens array;
- redirecting the optical beam within the chamber using a plurality of reflective elements; and
- passing the redirected optical beam repeatedly through said gaseous flow within said chamber to enhance light absorption and generate singlet delta oxygen using the plurality of reflective elements.

15. The method as set forth in claim 14, further comprising the step of reflecting remaining light back along an original path of travel.

16. The method as set forth in claim 14, wherein said step of directing includes directing the optical beam into said chamber perpendicular to said gaseous flow.

17. The method as set forth in claim 14, wherein said optical beam is directed into the chamber with incident continuous light fluences of 50–100 kw/cm$^2$.

18. The method as set forth in claim 14, wherein oxygen gas pressures range from approximately 30 torr to 70 torr, and oxygen gas temperatures range from approximately 100K to 150K.

19. The method as set forth in claim 14, wherein said step of redirecting yields absorption lengths ranging from approximately 10 meters to 20 meters.

20. The method as set forth in claim 14, wherein said gaseous flow of oxygen is passed through the chamber at a flow velocity of approximately 10 meters/second.

* * * * *